June 15, 1943.  O. ROSE  2,321,941

CLUTCH PLATE

Filed Nov. 5, 1941  2 Sheets-Sheet 1

INVENTOR.
OTTO ROSE

BY *Oberlin, Limbach & Day*
ATTORNEYS

June 15, 1943.  O. ROSE  2,321,941
CLUTCH PLATE
Filed Nov. 5, 1941  2 Sheets-Sheet 2

INVENTOR.
OTTO ROSE
BY Oberlin, Limbach & Day
ATTORNEYS

Patented June 15, 1943

2,321,941

UNITED STATES PATENT OFFICE 2,321,941

CLUTCH PLATE

Otto Rose, Cleveland, Ohio, assignor to Ira Saks

Application November 5, 1941, Serial No. 417,925

9 Claims. (Cl. 192—68)

The present invention relating, as indicated, to a clutch plate, has particular reference to that type of clutch plate commonly known as a "coil-spring-cushion-center" plate. In such type of clutch plate coiled compression springs are mounted between the hub element and the disc body of the plate. The hub element and the disc body of the plate are movably or rotatably mounted with respect to each other and the coil springs are adapted yieldably to absorb the torque or forces transmitted from the disc body to the hub so that there is produced a resultant cushioning or "dampening" effect, eliminating sudden shocks and impacts from being transmitted through the clutch. Accordingly, that part of the clutch plate assembly, including the hub and the coil springs, is usually called the "dampener" unit of the clutch plate.

The present invention constitutes an improvement in such dampener unit construction. The flange of the hub and the disc body, with the latter usually carrying an attached side or cover plate, all have removed portions, much in the nature of spaces between the spokes of a wheel, which are in axial alignment and of a size adequate to accommodate the coil springs. The ends of such springs, being of annular shape, would normally have to contact with the cross-sectional edges of the hub flange, the disc body, and of the cover plate. Considerable difficulty has been encountered in the past in preventing wear and deterioration of the ends of the springs at the point where they make bearing engagement with the last named elements of the clutch plate.

It is therefore the general object and nature of my invention to provide means, in the form of separate seating pins, which are located at each end of the coil springs and form a bearing contact or seat with the hub flange and disc body elements. Such seating means provide a maximum bearing surface for the annular shaped ends of the springs, and at the same time ensure an even distribution of the pressure exerted against the compression spring upon the cross-sectional bearing surfaces of the hub flange and disc body elements. In addition, the coil spring seating means of my invention protects the ends of the springs against undue damage and wear.

A further object of the invention is to provide juxtaposed shank portions upon the seating means projecting into the interior of the coil springs, and adapted to contact with each other upon compressive movement of the springs; thus serving as a positive limit stop for the relative rotative movement between the hub and the disc body. This last named feature of my invention possesses the substantial advantage of eliminating additional parts, such as limit stop rings, rivets or the like, and the additional weight which such parts would otherwise impart to the inertia or "spinning weight" of the clutch plate.

Another object of the invention is to provide means for effecting a differential or delayed action operation of certain of the coil springs. In other words, some of the coil springs are compressed by initial relative movement between the hub and the disc, and other of the springs are not called into action until further movement occurs. In this manner the resistance to movement between the hub and flange is greatly increased after the first initial movement has occurred, so that there is in effect a preliminary range of spring action which accommodates the lighter loads placed upon the dampening unit of the clutch, and a secondary range of spring action which accommodates the relatively heavier loads. The separate seating pins of my invention are especially adapted to the accomplishment of this last-noted object.

Additional objects and advantages of the invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Figure 1:
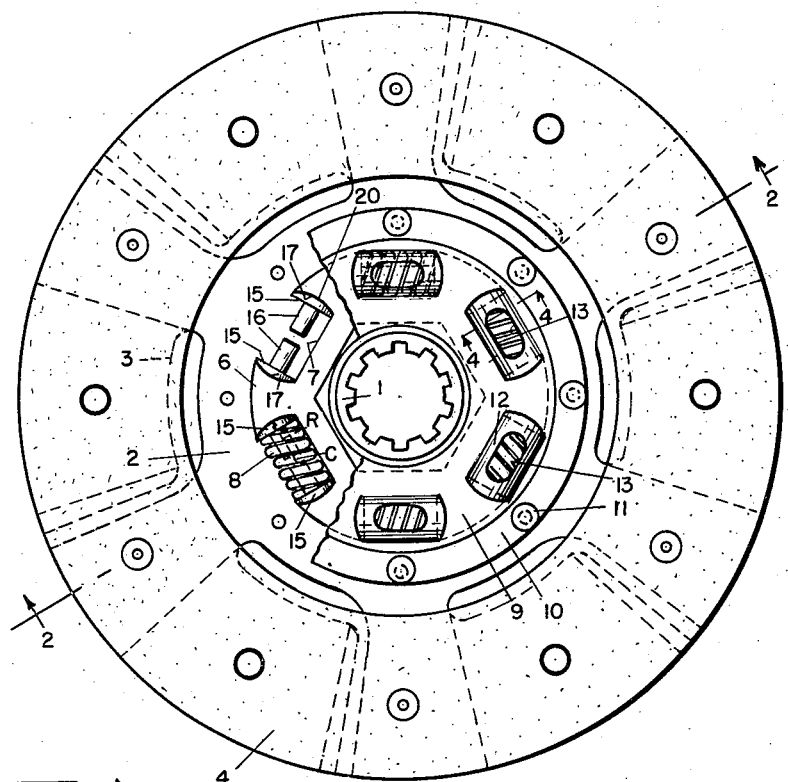
Fig. 1 is an elevational view, with portions broken away, of a clutch plate showing the structure embodying the principle of my invention.
Figure 2:
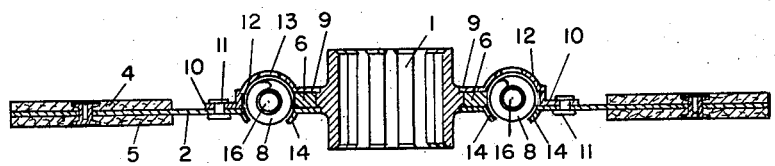
Fig. 2 is a cross-sectional view taken substantially along line 2—2 of Fig. 1.

Now referring more particularly to the drawings, the clutch plate shown therein comprises a hub 1 having a female spline fitting adapted to engage with the end of the clutch driven shaft, and a disc body 2 which is rotatably or movably mounted with respect to the hub 1. A series of cushion members 3 are formed in the outer marginal portion of the disc 2 and the friction facing rings 4 and 5 are attached thereto.

The hub 1 carries a radially extending flange 6 which has a series of circumferentially disposed recesses 7 for receiving the coil compression springs 8. The hub flange 6 is herein shown as constituting a separate piece from the hub 1 proper. Such construction does not constitute a part of the present invention, inasmuch as it is described in detail and claimed in the co-pending U. S. patent application of E. V. J. Tower Serial No. 373,014 filed January 3, 1941, now Patent No. 2,294,638, issued September 1, 1942.

A side plate or cover plate 9 is also mounted upon the hub 1 and covers that side of the flange 6 opposite to the disc 2. The cover plate 9 has an offset, annular flange 10 which is fixedly attached to the disc 2, such as by means of the rivets 11. Portions of the cover plate 9 are deformed into the form of substantially semi-circular housings or "sumps" 12 enclosing the coil springs 8. Air circulating and inspection louvers 13 are provided in the sides of the sumps 12.

Spring retaining lips 14 are provided in the disc 2 adjacent the other side of the coil springs 8.

Figure 3:
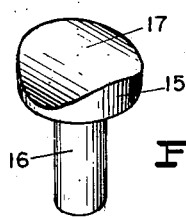
Fig. 3 is an enlarged perspective view of one of the coil spring seating pins.
Figure 5:
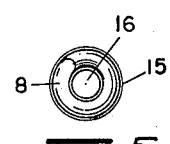
Fig. 5 is an enlarged detailed view looking toward the end of one of the coil spring ends showing its relationship with respect to the seating pin.

Seating pins, such as shown individually in Fig. 3 are mounted at each end of the coil springs 8. These seating pins comprise a circular head portion 15, which as shown in Fig. 5, is of a slightly larger diameter than that of the coil springs 8 when the latter are in normal, uncompressed position.

Figure 4:
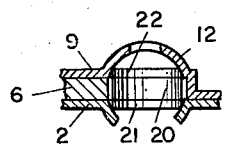
Fig. 4 is a detailed sectional view taken substantially along line 4—4.

The diameter of the head portion 15 is made larger than the normal outer diameter of the coil springs 8 in order to accommodate the slight increase in diameter of the latter when they are compressed. In this manner a full seating surface is provided for the ends of the coil springs at all times, and regardless of their respective stages of compression. The shank 16 of the seating pins extends into the interior of the coil springs 8 and is of a slightly less diameter than the inner diameter of the springs 8, thus providing a slight clearance space. The outer face of the heads 15 of the seating pins is of a bulging or protuberant contour and specifically in the form of a segment of a cylindrical surface, as indicated at 17. The seating pin head portion 17 fits against concavely curved portions or seats 20, 21 and 22 in the hub flange 6, in the disc 2 and in the cover plate 9 respectively. The relative axial position of the seats 20, 21 and 22 are best shown in Fig. 4.

The radius of curvature of the seating pin head portion 17 and likewise of the seats 20, 21 and 22 is substantially equal to one-half the length of the coil springs 8. The reason for this relationship becomes manifest when it is considered that a coil spring, when compressed or loaded at each end tends to assume a humped configuration, or simply to bend in the middle out of its normal longitudinal, straight line axial form. Thus, the longitudinal axial midpoint of the coil spring, such as indicated at C in Fig. 1, constitutes in effect the "hinge point" about which the two halves of the coil springs tend to bend when it is loaded. By making the radius of curvature R of the head portion 17 of the seating pins substantially equal to one-half the length of the coil springs 8, it thus becomes apparent that a uniform pressure distribution of the coil spring pressure over the seating surface is obtained at all times regardless of the possible longitudinal distortion of the springs.

It should also be noted that the above-described seating means tends to maintain the coil springs in proper longitudinal or circumferential alignment with respect to the hub and disc; and even if this alignment does become slightly disturbed, the uniform application of pressure to each end of the spring will nevertheless be maintained. Quite often the coil springs in a dampener unit tend to become "cocked" or thrown out of proper circumferential alignment so that their ends are not at all times parallel to the opposite ends of the spring receiving portions in the hub and flange. This may be due to a variety of causes, which need not be here enumerated, but when such cocking does occur, the spring seating pins of my invention compensate for it so that the compressive load or pressure applied to their ends is still uniformly distributed thereover.

It will also be noted that the shanks 16 of the seating pins are of a length slightly less than one-half that of the coil springs 8 so that the ends of such shanks are normally spaced apart, viz., when the coil springs are in uncompressed position. (See Fig. 1.) However when the coil springs 8 are compressed to their full permissible extent, the ends of the shanks 16 abut against each other and thus operate as positive limit stops preventing further rotation of the hub flange 6 with respect to the disc 2, and, of course, further compressive loading of the coil springs 8. In this manner the necessity for any additional limit stop devices, such as bosses, limit stop rings, lugs, rivets and the like, mounted between the disc body and the flange, is eliminated.

Figure 6:
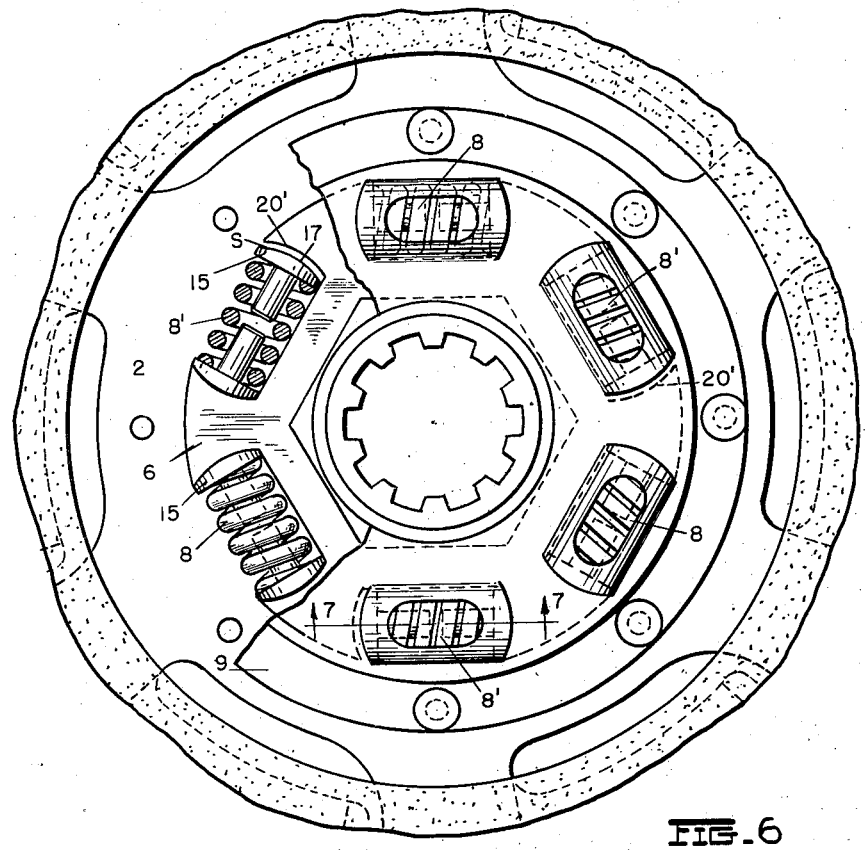
Fig. 6 is a view similar to Fig. 1, but showing a modified form of the invention adapted to effect the variable stages of coil spring action.
Figure 7:
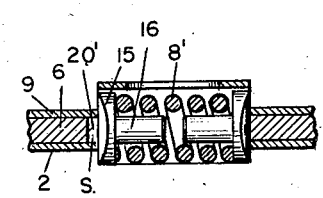
Fig. 7 is a detailed sectional view taken substantially along line 7—7 of Fig. 6.

Now referring to Figs. 6 and 7, there is shown therein the means whereby certain of the coil springs are compressed during the relative movement of the hub and disc, prior to the compression of other springs. This objective is achieved by providing a slight offset in the seating surfaces in the ends of certain of the spring receiving portions in the hub flange and in the disc body and side plate. Thus the hub flange 6 as shown in Fig. 6 has some of its seating portions, such as indicated at 20' slightly spaced from the outer surface 17 of the seating pin 15 so that there is a small clearance space S therebetween. As the hub flange 6 moves with respect to the disc body 2 and the cover plate 9 (as best illustrated in Fig. 7) the seating surface 20' does not contact the head of the pin 15 to compress the coil spring 8', until the clearance space S has been traversed.

Thus in the form of construction shown in Fig. 6, three of the coil springs marked 8, and having their seating pins in initial contact with the seating surfaces on the hub flange 6, the disc body 2 and the cover plate 9, are compressed upon initial movement between the hub and disc body;

and the other three coil springs marked 8', are not compressed until the clearance space S has been closed. In this manner, both relatively light and stiff spring pressure resistance is provided for the loads or forces transmitted through the dampener unit.

Figure 8:
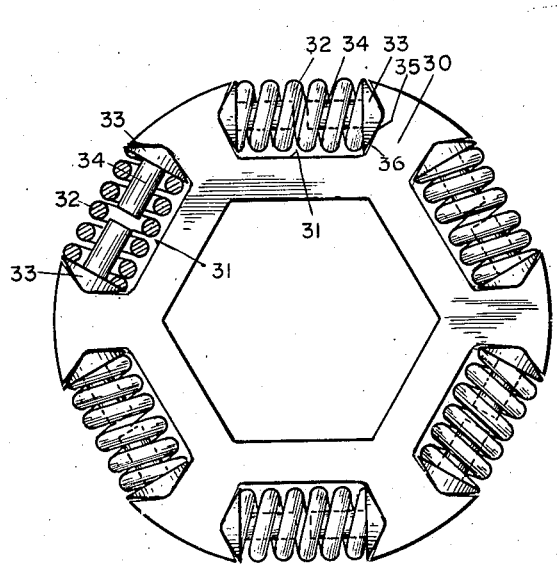
Fig. 8 is an elevational view of a hub flange, coil springs, and seating pins wherein the heads of the latter are shown in a modified form.

In Fig. 8 a modified form of construction for the outer surface of the seating pins is illustrated. It has been deemed necessary to illustrate only the hub flange 30 with its spring receiving recesses 31 and coil spring 32 mounted therein, in order to illustrate this form of construction, so as to be understood by those skilled in the art. Seating pins 33 are provided for the ends of the coil springs 32 and have shanks 34 extending into the interior thereof in the same manner as hereinbefore described. The outer end surfaces of the seating pins 33, however, are in the form of blunt wedges which fit in substantially complementary seating surfaces in the hub flange 30. As shown in the drawings, in slightly exaggerated form, this seating contact is not perfect or complete over its entire extent, but rather is the angle of the wedge of the head portion 35 slightly less, or slightly sharper than the angle of the concave seat portion 36. Of course, similarly shaped complementary seating surfaces are provided in the disc and cover plate, but an illustration of the latter in Fig. 8 has not been deemed necessary to be shown. The provision of the blunt, wedge shaped surfaces 35 on the seating pins 33, has the result of causing the seating pins to seek and maintain their proper circumferential alignment with respect to the seating surfaces in the hub flange, disc body and cover plate, and are also very effective in overcoming the previously mentioned difficulty of "spring cocking."

Figure 9:
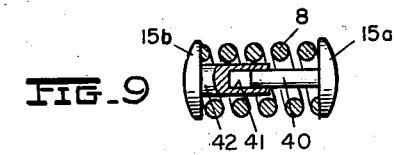
Fig. 9 is a detailed view of a modified form of construction for the seating pin shanks.

In the modified form of construction for the shanks of the seating pins, as shown in Fig. 9, such shanks are telescopically arranged with respect to each other instead of being of solid form with their ends normally spaced apart as previously described. Thus, in Fig. 9 the seating pin 15a has a relatively reduced diameter shank 40 which telescopically fits within an inner bore 41 in the end of the larger diameter shank 42 of the seating pin 15b. This construction not only provides a longitudinal alignment between the seating pins 15a and 15b, but also provides an air pocket within the inner bore 41 which upon being compressed by movement of the shank 40 therein, imparts an additional dampening action in aid of the compressive action of the spring 8.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch plate having a disc body and a flanged hub rotatably mounted with respect thereto, the combination of coil compression springs for transmitting torque between said disc body and said hub, and separate seating means for each end of said springs, said seating means having an inner circular portion presenting a flat surface for contacting said spring ends and an outer circular portion presenting a convex bearing surface for contacting said disc body and the flange of said hub, and a shank portion projecting from said circular portion into the interior of said spring, the length of said shank portion on each of said seating means being less than one-half the normal length of said springs but greater than one-half the fully compressed length thereof whereby the opposed ends of said shank portions are adapted to contact each other to limit the compressive movement of said springs.

2. In a clutch plate, a disc body, a flanged hub rotatably mounted with respect thereto, the flange of said hub overlying said disc body, said disc body and said flange having a series of rectangularly shaped, axially aligned, coiled spring receiving portions, the opposite ends of said portions being concavely curved, coil compression springs, and seating pins having a head and a shank adapted to fit within each end of said springs, the head of said pins being in the form of a section of a cylinder having a flat side for contacting the ends of said springs and a convex side adapted to fit against said concavely curved portions.

3. In a clutch plate, a disc body, a flanged hub rotatably mounted with respect thereto, the flange of said hub overlying said disc body, said disc body and said flange having a series of rectangularly shaped, axially aligned, coiled spring receiving portions, the opposite ends of said portions being concavely curved, coil compression springs, and seating pins adapted to fit within each end of said springs, said pins having a convexly curved head portion adapted to fit against said concavely curved portions, the radius of curvature of said concavely and convexly curved portions being substantially equal to one-half the length of said springs.

4. In a clutch plate, a disc body, a flanged hub rotatably mounted with respect thereto, the flange of said hub overlying said disc body, said disc body and said flange having a series of rectangularly shaped, axially aligned, coiled spring receiving portions, the opposite ends of said portions being concavely curved, coil compression springs, and seating pins adapted to fit within each end of said springs, said pins having a convexly curved head portion adapted to fit against said concavely curved portions, said seating pins having shank portions projecting into the interior of said springs, the length of said shank portions being less than one-half the normal length of said springs but greater than one-half the fully compressed length thereof whereby the opposed ends of said shank portions are adapted to contact each other to limit the compressive movement of said springs.

5. In a clutch plate, a disc body, a flanged hub rotatably mounted with respect thereto, the flange of said hub overlying said disc body, said disc body and said flange having a series of rectangularly shaped, axially aligned, coiled spring receiving portions, the opposite ends of said portions being concavely curved, coil compression springs, and seating pins adapted to fit within each end of said springs, said pins having a convexly curved head portion adapted to fit against said concavely curved portions, the radius of curvature of said concavely and convexly curved portions being substantially equal to one-half the length of said springs, said seating pins having shank portions projecting into the interior of said springs, the length of said shank portions being less than one-half the normal length of said springs but greater than one-half the fully compressed length thereof whereby the opposed ends of said shank portions are adapted to contact each other to limit the compressive movement of said springs.

6. In a clutch plate, a disc body, a flanged hub rotatably mounted with respect thereto, the flange of said hub overlying said disc body, said disc body and said flange having a series of rectangularly shaped, axially aligned coil spring receiving portions, the opposite ends of said portions being concavely curved, coil compression springs, and seating pins comprising a shank and a circular head, the inner face of said head contacting each end of said springs, with said shank projecting into the interior thereof, the outer face of said head being in the form of a segment of a cylindrical surface and adapted to fit against said concavely curved portions.

7. In a clutch plate, a disc body, a flanged hub rotatably mounted with respect thereto, the flange of said hub overlying said disc body, said disc body and said flange having a series of rectangularly shaped, axially aligned coil spring receiving portions, the opposite ends of said portions being concavely curved, coil compression springs, and seating pins comprising a shank and a circular head, the inner face of said head contacting each end of said springs, with said shank projecting into the interior thereof, the outer face of said head being in the form of a segment of a cylindrical surface and adapted to fit against said concavely curved portions, the length of said shanks being less than one-half the normal length of said springs but greater than one-half the fully compressed length thereof whereby the opposed ends of said shanks are adapted to contact each other to limit the compressive movement of said springs.

8. In a clutch plate, a disc body, a flanged hub rotatably mounted with respect thereto, the flange of said hub overlying said disc body, said disc body and said flange having a series of rectangularly shaped, axially aligned coil spring receiving portions, the opposite ends of said portions being concavely curved, coil compression springs, and seating pins comprising a shank and a circular head, the inner face of said head contacting each end of said springs, with said shank projecting into the interior thereof, the outer face of said head being in the form of a segment of a cylindrical surface and adapted to fit against said concavely curved portions, the length of said shanks being less than one-half the normal length of said springs but greater than one-half the fully compressed length thereof whereby the opposed ends of said shanks are adapted to contact each other to limit the compressive movement of said springs, the radius of curvature of such cylindrical surface on said head substantially equal to one-half the length of said springs.

9. In a clutch plate, a disc body, a flanged hub rotatably mounted with respect thereto, the flange of said hub overlying said disc body, said disc body and said flange having a series of rectangularly shaped, axially aligned coil spring receiving portions, the opposite ends of said portions being concavely curved, coil compression springs, and seating pins comprising a shank and a circular head, the inner face of said head contacting each end of said springs, with said shank projecting into the interior thereof, the outer face of said head being in the form of a segment of a cylindrical surface and adapted to fit against said concavely curved portions, the length of said shanks being less than one-half the normal length of said springs but greater than one-half the fully compressed length thereof whereby the opposed ends of said shanks are adapted to contact each other to limit the compressive movement of said springs, the radius of curvature of such cylindrical surface on said head being substantially equal to one-half the length of said springs, and the diameter of said head being slightly greater than the outer diameter of said springs when the latter are in normal position.

OTTO ROSE.